(12) United States Patent
Komura et al.

(10) Patent No.: US 12,482,803 B2
(45) Date of Patent: Nov. 25, 2025

(54) PRODUCTION METHOD FOR ELECTRODE MEMBER (71) Applicants: TOYOTA JIDOSHA KABUSHIKI KAISHA, Toyota (JP); KUREHA CORPORATION, Tokyo (JP)

(72) Inventors: Shingo Komura, Nagakute (JP); Yoshiyuki Nagasawa, Tokyo (JP); Mitsuyasu Sakuma, Tokyo (JP)

(73) Assignees: TOYOTA JIDOSHA KABUSHIKI KAISHA, Toyota (JP); KUREHA CORPORATION, Tokyo (JP)

( * ) Notice: Subject to any disclaimer, the term of this patent is extended or adjusted under 35 U.S.C. 154(b) by 352 days.

(21) Appl. No.: 18/032,992

(22) PCT Filed: Oct. 21, 2021

(86) PCT No.: PCT/JP2021/038914
§ 371 (c)(1),
(2) Date: Oct. 23, 2023

(87) PCT Pub. No.: WO2022/085759
PCT Pub. Date: Apr. 28, 2022

(65) Prior Publication Data
US 2024/0072233 A1 Feb. 29, 2024

(30) Foreign Application Priority Data
Oct. 23, 2020 (JP) .................. 2020-177685

(51) Int. Cl.
*B29C 71/02* (2006.01)
*B29C 70/88* (2006.01)
(Continued)

(52) U.S. Cl.
CPC ......... *H01M 4/0433* (2013.01); *B29C 70/882* (2013.01); *H01M 4/0404* (2013.01);
(Continued)

(58) Field of Classification Search
CPC ... B29C 70/882; B29C 71/02; B29K 2027/12; B29K 2027/16; B29K 2995/0005;
(Continued)

(56) References Cited

U.S. PATENT DOCUMENTS

| 5,776,637 A | 7/1998 | Kashio et al. |
| 2007/0259271 A1 | 11/2007 | Nanno et al. |

(Continued)

FOREIGN PATENT DOCUMENTS

| JP | 09-289023 A | 11/1997 |
| JP | 10-284052 A | 10/1998 |

(Continued)

OTHER PUBLICATIONS

International Search Report for PCT/JP2021/038914 dated Dec. 14, 2021 [PCT/ISA/210].

*Primary Examiner* — Leo B Tentoni
(74) *Attorney, Agent, or Firm* — Sughrue Mion, PLLC (57) ABSTRACT

A method for producing an electrode member that configures an electrode body of an all-solid-state battery, including: a slurry preparation step for preparing a mixed material slurry that contains at least a binder, solid electrolyte particles, and a nonaqueous solvent with low polarity; a molding step for molding the mixed material slurry into a desired shape; and a drying step for obtaining a molded body by removing the nonaqueous solvent with low polarity from the mixed material slurry after the molding. Then, the temperature of the mixed material slurry is controlled so as not to cause re-crystallization of the binder, which has been dissolved in the nonaqueous solvent with low polarity, at least until the initiation of the molding step. Consequently, it is possible to stably provide an all-solid-state battery that has (Continued)

low battery resistance, while improving electrode member production efficiency by preventing gelation of a mixed material slurry.

6 Claims, 5 Drawing Sheets

(51) Int. Cl.
| | | |
|---|---|---|
| *H01M 4/04* | (2006.01) | |
| *H01M 4/139* | (2010.01) | |
| *H01M 4/1391* | (2010.01) | |
| *H01M 4/62* | (2006.01) | |
| *H01M 10/0525* | (2010.01) | |
| *B29K 27/00* | (2006.01) | |
| *B29K 27/12* | (2006.01) | |

(52) U.S. Cl.
CPC ......... *H01M 4/1391* (2013.01); *H01M 4/623* (2013.01); *B29K 2027/12* (2013.01); *B29K 2027/16* (2013.01); *B29K 2995/0005* (2013.01)

(58) Field of Classification Search
CPC .. H01M 4/0404; H01M 4/139; H01M 4/1391; H01M 4/623; H01M 10/0525
USPC .......... 264/40.6, 104, 105, 129, 234, 331.14
See application file for complete search history.

(56) References Cited

U.S. PATENT DOCUMENTS

| | | |
|---|---|---|
| 2015/0147660 A1 | 5/2015 | Fujiki et al. |
| 2016/0028107 A1 | 1/2016 | Kubo et al. |

FOREIGN PATENT DOCUMENTS

| | | |
|---|---|---|
| JP | 11-086865 A | 3/1999 |
| JP | 2004-247180 A | 9/2004 |
| JP | 2004-247184 A | 9/2004 |
| JP | 2016-025027 A | 2/2016 |
| JP | 2017-188397 A | 10/2017 |
| JP | 2019-040767 A | 3/2019 |
| KR | 10-2015-0060517 A | 6/2015 |
| WO | 2020/156972 A1 | 8/2020 |

PRODUCTION METHOD FOR ELECTRODE MEMBER

CROSS REFERENCE TO RELATED APPLICATIONS

This application is a National Stage of International Application No. PCT/JP2021/038914 filed Oct. 21, 2021, claiming priority based on Japanese Patent Application No. 2020-177685 filed Oct. 23, 2020.

TECHNICAL FIELD

The present disclosure relates to a production method for an electrode member. For more details, it relates to a method for producing an electrode member that configures an electrode body of an all-solid-state battery. Incidentally, this international application claims the benefit of priority to Japanese Patent Application No. 2020-177685 filed on Oct. 23, 2020. The entire contents of this application are hereby incorporated herein by reference.

BACKGROUND ART

A secondary battery, such as lithium ion secondary battery, has been widely used in fields of a portable power supply, such as personal computer and portable terminal, and of a power supply for driving a vehicle, such as electric vehicle (EV), hybrid vehicle (HV), and plug-in hybrid vehicle (PHV). The secondary battery described above normally includes a positive electrode, a negative electrode, and an electrolyte. As one example of the secondary battery described above, it is possible to use a liquid type battery that uses an electrolytic solution as the electrolyte. In addition, as another example, it is possible to use an all-solid-state battery that uses a solid electrolyte as the electrolyte.

In addition, the electrodes (positive electrode and negative electrode) of the secondary battery can be produced, for example, by coating a surface of a collector foil with a mixed material slurry in which a predetermined material is kneaded, and by drying the resultant. Into this mixed material slurry, a binder has been added in order to bind granular materials, such as active materials, to each other. As this binder, a polymer is used that can be dissolved or dispersed into a solvent of the mixed material slurry. For example, in a case where the solvent of the mixed material slurry is a water type one, styrene butadiene rubber (SBR), or the like, can be used as the binder. On the other hand, in a case of a nonaqueous type solvent, polyvinylidene fluoride (PVdF), or the like, can be used. In addition, it is known that functions of these binders are influenced by a temperature effect. For example, in order to properly induce the function of the binder on the liquid type battery, techniques for controlling a temperature of the mixed material slurry are disclosed in Patent Documents 1 to 3.

CITATION LIST

Patent Document

[Patent Document 1] Japanese Patent Application Publication No. H10-284052
[Patent Document 2] Japanese Patent Application Publication No. 2017-188397
[Patent Document 3] Japanese Patent Application Publication No. 2004-247180

SUMMARY OF INVENTION

Technical Problem

Anyway, recently, from a perspective of enhancing a safety property, implementing miniaturization, or the like, a request for a practical application of the all-solid-state battery is increased. On the all-solid-state battery described above, a solid electrolyte layer containing a solid electrolyte particle is arranged between the positive electrode and the negative electrode, which is different from the liquid type battery. This solid electrolyte layer not only has a role of being as the electrolytic solution on the liquid type battery but also has a role of being as a separator. In addition, regarding another feature of the all-solid-state battery, the solid electrolyte particle is added not only to the solid electrolyte layer but also to the positive electrode and the negative electrode. Then, the solid electrolyte layer of the all-solid-state battery is produced, similarly to the positive electrode and the negative electrode, by molding the mixed material slurry containing the solid electrolyte particle and the binder to be in a desired shape and then by drying the resultant.

However, in a case of producing the all-solid-state battery, there was a matter that the mixed material slurry gelated while the positive electrode, the negative electrode, and the solid electrolyte layer (hereinafter, referred to as "electrode member") were produced. A viscosity of this mixed material slurry having gelated drastically rises, and thus it becomes difficult to perform molding in a desired shape. Additionally, in the slurry having gelated, the granular materials, such as active substance and solid electrolyte particle, are unevenly distributed. Thus, there is a possibility that a battery resistance greatly rises when the gelated slurry is used so as to produce the electrode member.

The present disclosure has been made in view of the above-described circumstances, and has a purpose of inhibiting the gelation of the mixed material slurry at least until a molding step is started in the production of the electrode member of the all-solid-state battery.

Solution to Problem

The present inventor has repeated experiments and has further examined in order to solve the above described problem, and then has found a cause that the mixed material slurry gelates in the production of the electrode member of the all-solid-state battery. Particularly, in a case of the all-solid-state battery, the solid electrolyte particles are contained in the electrode member (positive electrode, negative electrode, and solid electrolyte layer). Thus, in the preparation of the mixed material slurry, it is required to use a low polarity nonaqueous solvent whose reactivity with the solid electrolyte particle is low. However, this low polarity nonaqueous solvent has a low solubility of the binder, and thus has a characteristic that a crystal component of the once-dissolved binder tends to re-crystallize. Then, the viscosity of the binder having re-crystallized rises drastically and thus there is a fear of making the mixed material slurry gelate. Based on the knowledge described above, the present inventor has thought that, if the crystal component of the binder having been dissolved in the solvent can be inhibited from re-crystallizing in the production step of the electrode member of the all-solid-state battery, the gelation of the mixed material slurry can be inhibited. A production method for the electrode member (hereinafter, simply referred to as "production method", too) disclosed herein has been made on a basis of the knowledge described above.

A herein disclosed production method includes a slurry preparation step that prepares a mixed material slurry which contains at least a binder, a solid electrolyte particle, and a low polarity, includes a molding step that molds a mixed material slurry in a desired shape, and includes a drying step that removes a low polarity nonaqueous solvent from a molded mixed material slurry so as to obtain a molded body. Then, in the herein disclosed production method, at least until a molding step is started, a temperature of a mixed material slurry is controlled to inhibit re-crystallization of a binder dissolved in a low polarity nonaqueous solvent.

In the production method configured as described above, the temperature of the mixed material slurry is controlled to inhibit the crystal component of the binder dissolved in the solvent from re-crystallizing, and thus it is possible to inhibit the gelation of the mixed material slurry. Then, in this production method, the gelation of the mixed material slurry is inhibited at least until the molding step is started, and thus it is possible to suitably inhibit the reduction in the production efficiency caused by the drastic rise in the viscosity, the rise in the battery resistance caused by the uneven distribution of the granular materials, and the like.

In one suitable aspect of the herein disclosed production method, a binder is polyvinylidene fluoride (PVdF). The PVdF has a higher voltage resistance property and has a lower reactivity with respect to the solid electrolyte particle, thus the PVdF has an advantage of being suitable as the binder used for the electrode member of the all-solid-state battery. But, the PVdF has a particularly lower solubility with respect to the low polarity nonaqueous solvent, and therefore the PVdF has a disadvantage of tending to induce the gelation of the mixed material slurry caused by the re-crystallization. In contrast, the herein disclosed production method can inhibit the gelation of the mixed material slurry caused by the re-crystallization of the binder, and thus it is possible to solve the disadvantage caused by using the PVdF as the binder and to obtain only the advantage.

Additionally, in an aspect of using the PVdF as the binder, it is preferable that the PVdF is PVdF-HFP that is a copolymer with vinylidene fluoride (VDF) and hexafluoropropylene (HFP). The PVdF-HFP has a comparatively higher solubility with respect to the low polarity nonaqueous solvent, and thus it is possible to suitably inhibit the re-crystallization of the dissolved binder.

Regarding one suitable aspect of the herein disclosed production method, in a case where a melt starting temperature of a binder is represented as $T_m$ and a maximum temperature of a mixed material slurry is represented as $T_{max}$, a temperature of a mixed material slurry is controlled, at least until a molding step is started, to satisfy following Formula (1).

$$T_{max} \leq T_m \tag{1}$$

In the present aspect, at least until the molding step is started, the temperature of the mixed material slurry is controlled to make the maximum temperature $T_{max}$ of the mixed material slurry be equal to or less than the melt starting temperature $T_m$ of the binder ($T_{max} \leq T_m$). By doing this, the dissolution of the crystal component of the binder itself is inhibited, and thus it is possible to suitably inhibit the gelation of the mixed material slurry caused by the re-crystallization of the once-dissolved binder.

Additionally, in an aspect of controlling the temperature of the mixed material slurry to satisfy Formula (1) described above, it is preferable that a maximum temperature $T_{max}$ of a mixed material slurry is a temperature lower than a melt starting temperature $T_m$ of a binder by 5° C. or more. By doing this, it is possible to surely inhibit the dissolution of the crystal component of the binder.

Regarding one suitable aspect of the herein disclosed production method, in a case where a melt starting temperature of the binder is represented as $T_m$, a re-crystallization temperature of the binder is represented as $T_c$, a boiling point of a low polarity nonaqueous solvent is represented as $T_b$, a maximum temperature of a mixed material slurry is represented as $T_{max}$, and a minimum temperature of the mixed material slurry is represented as $T_{min}$, a temperature of the mixed material slurry is controlled, at least until a molding step is started, to satisfy following Formula (2) and Formula (3).

$$T_m < T_{max} < T_b \tag{2}$$

$$T_{min} \geq T_c \tag{3}$$

In the present aspect, the maximum temperature $T_{max}$ of the mixed material slurry exceeds the melt starting temperature $T_m$ of the binder ($T_m < T_{max}$), and thus the crystal component of the binder is dissolved in the low polarity nonaqueous solvent. However, in the present aspect, the temperature of the mixed material slurry is controlled to make the minimum temperature $T_{min}$ of the mixed material slurry be equal to or more than the re-crystallization temperature $T_c$ of the binder ($T_{min} \geq T_c$). Thus, it is possible to keep the state in which the crystal component of the binder is dissolved in the solvent. By doing this, it is possible to suitably inhibit the gelation of the mixed material slurry caused by the re-crystallization of the binder. Incidentally, if the maximum temperature $T_{max}$ of the mixed material slurry becomes too high and exceeds the boiling point $T_b$ of the low polarity nonaqueous solvent, there is a possibility that the low polarity nonaqueous solvent evaporates and thus that the viscosity of the mixed material slurry drastically rises. Thus, in the present aspect, the maximum temperature $T_{max}$ of the mixed material slurry is controlled to be less than the boiling point $T_b$ of the low polarity nonaqueous solvent ($T_{max} < T_b$).

Additionally, in an aspect of controlling the temperature of the mixed material slurry to satisfy Formula (2) and Formula (3) described above, a minimum temperature $T_{min}$ of a mixed material slurry is a temperature higher than a re-crystallization temperature $T_c$ of a binder by 5° C. or more. By doing this, it is possible to surely keep the state in which the crystal component of the binder is dissolved in the solvent.

In one aspect of the herein disclosed production method, an electrode member is a positive electrode or a negative electrode in which a mixed material layer containing a solid electrolyte particle and an electrode active substance is formed on a surface of a collector foil, and at a molding step, a surface of a collector foil is coated with a mixed material slurry. In accordance with the herein disclosed production method, it is possible to produce the positive electrode and the negative electrode of the all-solid-state battery. In a case where these electrodes are produced, it is possible, by using the molding step of coating the surface of the collector foil with the mixed material slurry, to enhance the production efficiency.

Additionally, in one aspect of the herein disclosed production method, an electrode member is a solid electrolyte layer containing a solid electrolyte particle, and at a molding step, a surface of a foil-shaped base material is coated with a mixed material slurry and a foil-shaped base material is peeled off from a molded body obtained after a drying step. In the herein disclosed production method, it is possible to produce the solid electrolyte layer of the all-solid-state battery. In a case where the solid electrolyte layer is produced, it is preferable that the surface of the foil-shaped base material is coated with the mixed material slurry and the base material is peeled off from the dried mixed material slurry. By doing this, it is possible to efficiently and easily produce the solid electrolyte layer.

DESCRIPTION OF EMBODIMENTS

Below, an embodiment of a herein disclosed technique will be described. Incidentally, the embodiment described below is not intended to restrict the herein disclosed technique. In addition, the matters other than matters particularly mentioned in this description and required for practicing the herein disclosed technique (for example, a detailed configuration of an apparatus (applicator, or the like) used for producing the electrode member, or the like) can be grasped as design matters of those skilled in the art based on the related art in the present field. The herein disclosed technique can be implemented on a basis of a content disclosed in the present description and a common general technical knowledge in this field. Additionally, in the present description, when a numerical value range is represented by A to B (here, A and B are arbitrary values), it means equal to or more than A and not more than B.

1. Configuration of all-Solid-State Battery

In the present description, for convenience sake of explanation, a structure of an all-solid-state battery is firstly explained. Incidentally, the structure of the all-solid-state battery explained below is not intended to restrict a production method for an electrode member disclosed herein.

(1) Whole Structure

Figure 1:
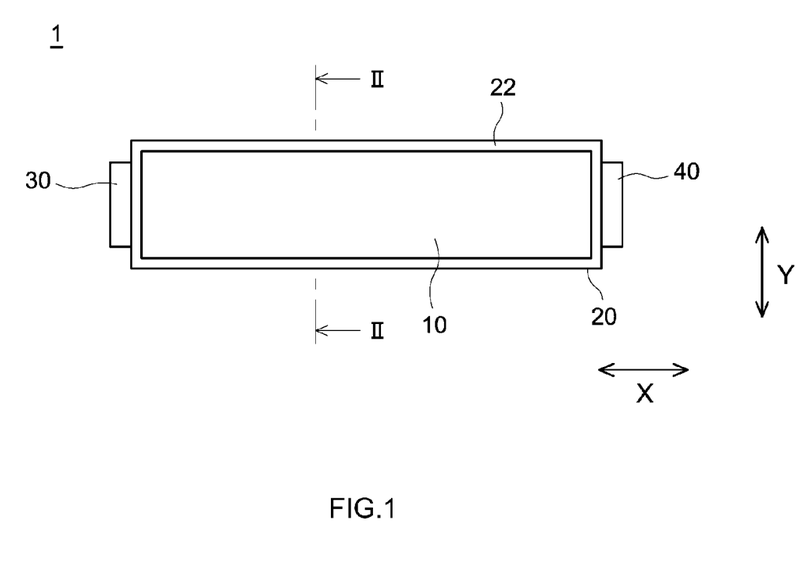
FIG. 1 is a plane view that schematically shows an example of an all-solid-state battery.
Figure 2:
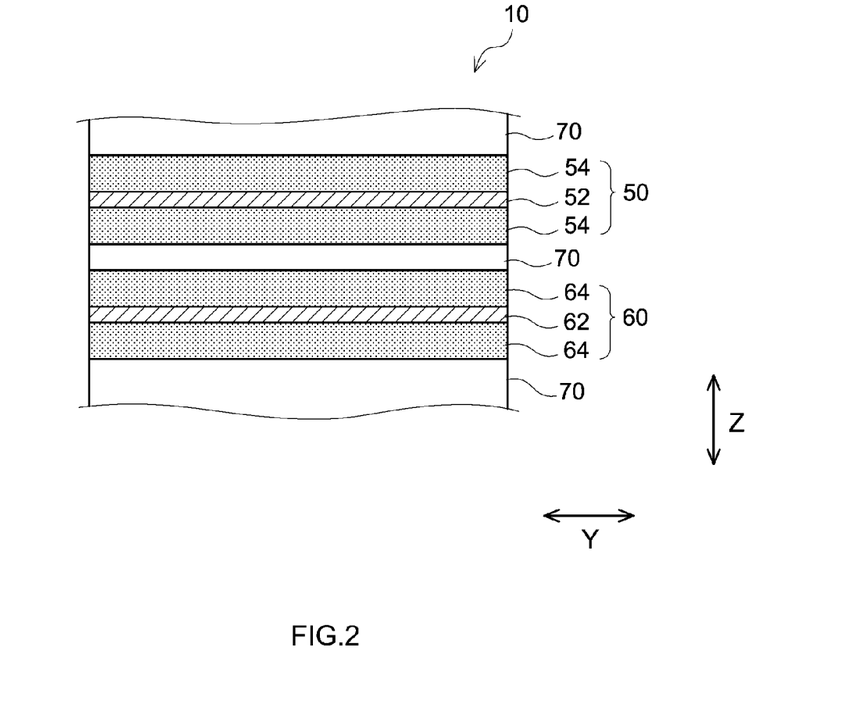
FIG. 2 is a II-II arrow cross section view of FIG. 1.

FIG. 1 is a plane view that schematically shows an example of the all-solid-state battery. In addition, FIG. 2 is a II-II arrow cross section view of FIG. 1. Incidentally, in figures, a reference sign X represents "width direction (of the all-solid-state battery)", a reference sign Y represents "depth direction (of the all-solid-state battery)", and a reference sign Z represents "height direction (of the all-solid-state battery)". However, these directions are defined for convenience sake of explanation, and are not intended to restrict a disposed aspect for a case where the all-solid-state battery is used.

As shown in FIG. 1, this all-solid-state battery 1 includes an electrode body 10, and an outer package 20 that is configured to accommodate this electrode body 10. In particular, a pair of laminate films is arranged to sandwich the electrode body 10 and to be opposed to each other, and then outer circumferential edge parts of this laminate films are welded. By doing this, the outer package 20 is formed on which a welding part 22 is formed at the outer circumferential edge part, and the electrode body 10 is accommodated in an inside of it.

At one (left side in FIG. 1) of side edge parts in the width direction X of this all-solid-state battery 1, a positive electrode terminal 30 is provided. One end of the positive electrode terminal 30 is connected to the electrode body 10 inside the outer package 20, and the other end is exposed to an outside of the outer package 20. The positive electrode terminal 30 is configured with aluminum, or the like. In addition, at the other one (right side in FIG. 1) of the side edge parts in the width direction X of the all-solid-state battery 1, a negative electrode terminal 40 is provided. Similarly to the positive electrode terminal 30, one end of the negative electrode terminal 40 is connected to the electrode body 10, and the other end is exposed to the outside of the outer package 20. Incidentally, the negative electrode terminal 40 is configured with copper, or the like.

As shown in FIG. 2, the electrode body 10 is configured by sequentially laminating plural sheet materials, each of which consists of a positive electrode 50, a negative electrode 60, and a solid electrolyte layer 70. In the present description, all of the sheet materials configuring the electrode body 10 described above are together referred to as "electrode member". In other words, "electrode member" in the present description is a general term for a configuration material of the electrode body and semantically covers the positive electrode, the negative electrode, and the solid electrolyte layer. Below, each of the electrode members will be described.

(1) Positive Electrode

The positive electrode 50 includes a positive electrode collector foil 52, and a positive electrode mixed material layer 54 formed on a surface (both surfaces) of this positive electrode collector foil 52. It is preferable that the positive electrode collector foil 52 is configured with, for example, an electrical conducting material, such as aluminum and aluminum alloy. In addition, the positive electrode collector foil 52 is electrically connected to the above described positive electrode terminal 30 (see FIG. 1). On the other hand, the positive electrode mixed material layer 54 contains a positive electrode active material, a solid electrolyte particle, and a binder.

The positive electrode active material is a material that can reversibly store and emit a charge carrier (for example, lithium ion). As the positive electrode active material, it is possible to use a material that can be used for this kind of secondary battery, without particularly restriction. As one example of the positive electrode active material described above, it is possible to use a lithium transition metal composite oxide, such as lithium-nickel containing composite oxide, lithium-cobalt containing composite oxide, lithium-nickel-cobalt containing composite oxide, lithium-manganese containing composite oxide, and lithium-nickel-cobalt-manganese containing composite oxide, or the like.

The solid electrolyte particle is a granular solid electrolyte. Incidentally, as for the solid electrolyte particle being contained in the positive electrode mixed material layer 54, it is possible to use the same kind of material as one being used for the solid electrolyte layer 70 described later, and thus detailed explanation is omitted here.

The binder is to bind the granular materials (positive electrode active material, solid electrolyte particle, and the like) in the positive electrode mixed material layer 54 to each other, so as to enhance a molding property of the positive electrode mixed material layer 54. It is preferable as the binder of the all-solid-state battery 1 to select a polymer whose voltage resistance property is high and whose reactivity with respect to the solid electrolyte particle is low. From a perspective described above, it is possible as the polymer to use polyvinylidene fluoride (PVdF), polyvinylidene chloride (PVdC), polytetrafluoroethylene (PTFE), perfluoroalkoxy alkane (PFA), ethylene-tetrafluoroethylene polymer (ETFE), ethylene/chlorotrifluoroethylene copolymer (ECTFE), or the like. In addition, for more details described later, regarding the production of the all-solid-state battery 1, from a perspective of reaction inhibition with the solid electrolyte particle, a low polarity nonaqueous solvent is used as a solvent of the mixed material slurry. If an affinity (solubility/dispersibility) of the binder with respect to the low polarity nonaqueous solvent becomes too low, it might become difficult to perform a later-described temperature control of the mixed material slurry. From a perspective described above, it is preferable as the binder to select one whose affinity with respect to the low polarity nonaqueous solvent is outstanding. As one example for this kind of binder, it is possible to use a copolymer (PVdF-HFP) with vinylidene fluoride (VDF) and hexafluoropropylene (HFP), or the like.

Incidentally, the positive electrode mixed material layer 54 might contain an additive other than the above described materials. As said other additive, it is possible to use a conventionally known material capable of being added to the positive electrode mixed material layer of the secondary battery, if an effect of the herein disclosed technique is not inhibited. As one example of the additive, it is possible to use an electrical conducting material, or the like. As the electrical conducting material, it is possible to use acetylene black, vapor grown carbon fiber (VGCF), or the like.

(2) Negative Electrode

The negative electrode 60 includes a negative electrode collector foil 62, and a negative electrode mixed material layer 64 imparted on a surface (both surfaces) of this negative electrode collector foil 62. It is preferable that the negative electrode collector foil 62 is configured with, for example, an electrical conducting material, such as copper and copper alloy. In addition, the negative electrode collector foil 62 is electrically connected to the negative electrode terminal 40 (see FIG. 1). On the other hand, the negative electrode mixed material layer 64 contains a negative electrode active material, a solid electrolyte particle, and a binder. The negative electrode active material is a material that can reversibly store and emit the charge carrier (for example, lithium ion). As the negative electrode active material, it is possible to use a material that can be used for this kind of secondary battery, without particularly restriction. As one example of the negative electrode active material, it is possible to use a carbon material, such as hard carbon, graphite, and boron added carbon. In addition, as for the binder and the solid electrolyte particle, it is possible to use the same kind of materials as materials of the positive electrode mixed material layer 54, and thus overlapped explanation is omitted. Incidentally, the negative electrode mixed material layer 64 might contain a material other than the negative electrode active material, the binder, and the solid electrolyte particle (for example, electrical conducting material, thickening agent, or the like). As said additive agent, it is possible to use a conventionally known material capable of being added to the negative electrode mixed material layer of the secondary battery, if an effect of the herein disclosed technique is not inhibited.

(3) Solid Electrolyte Layer

The solid electrolyte layer 70 is arranged between the positive electrode 50 and the negative electrode 60. The solid electrolyte layer 70 includes a function as the electrolyte implementing conduction with the charge carrier (for example, Li ion) between the positive electrode 50 and the negative electrode 60. And, the solid electrolyte layer 70 includes another function as a separator establishing an insulation between the positive electrode 50 and the negative electrode 60. The solid electrolyte layer 70 described above contains the solid electrolyte particle and the binder. Incidentally, as for the binder, it is possible to use the same kind of material as the materials of the positive electrode mixed material layer 54 and the negative electrode mixed material layer 54, and thus overlapped explanation is omitted.

On the other hand, as for the solid electrolyte particle, it is possible to use a sulfide solid electrolyte, an oxide solid electrolyte, a nitride solid electrolyte, halide solid electrolyte, or the like. Among these solid electrolytes, it is preferable to use sulfide solid electrolyte from a perspective of having a superior ion conduction property. As one example of the sulfide solid electrolyte described above, it is possible to use a $Li_2S$—$SiS_2$ type material, a $Li_2S$—$P_2S_3$ type material, a $Li_2S$—$P_2S_5$ type material, a $Li_2S$—$GeS_2$ type material, a $Li_2S$—$B_2S_3$ type material, a $Li_3PO_4$—$P_2S_5$ type material, a $Li_4SiO_4$—$Li_2S$—$SiS_2$ type material, or the like. In addition, from a perspective of implementing a higher ion conduction property, it is possible as the sulfide solid electrolyte to use a $Li_2S$-based solid solution that is configured with $Li_2S$ and lithium halide (for example, LiCl, LiBr, or LiI). As a suitable example of the sulfide solid electrolyte described above, it is possible to use LiBr—$Li_2S$—$P_2S_5$, LiI—$Li_2S$—$P_2S_5$, LiBr—LiI—$Li_2S$—$P_2S_5$, or the like.

As described above, the electrode materials (the positive electrode 50, the negative electrode 60, and the solid electrolyte layer 70) configuring the electrode body 10 of the all-solid-state battery 1 are common in a point of including the layer that contains the solid electrolyte particle and the binder. By performing the production method disclosed herein, it is possible to produce the electrode member containing the binder and the solid electrolyte particle as described above. In other words, the herein disclosed production method can be applied to produce any of the positive electrode, the negative electrode, and the solid electrolyte layer.

2. Production Method for Electrode Member

Figure 3:
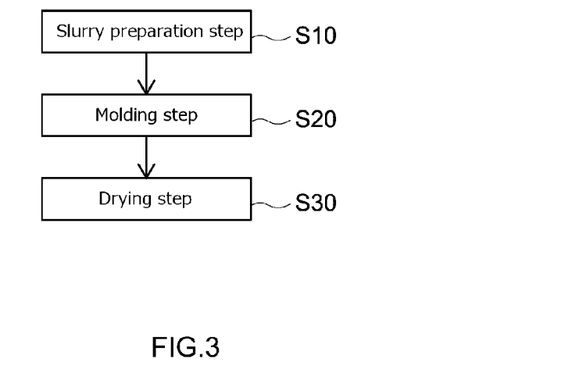
FIG. 3 is a flow chart that shows a production method of the all-solid-state battery disclosed herein.

Next, the herein disclosed production method for the electrode member will be described. FIG. 3 is a flowchart that shows the herein disclosed production method for the electrode member. As shown in FIG. 3, the herein disclosed production method includes a slurry preparation step S10, a molding step S20, and a drying step S30. Below, each step will be described.

(1) Slurry Preparation Step S10

At the present step, the mixed material slurry is prepared that contains at least the binder, the solid electrolyte particle, and the low polarity nonaqueous solvent. Incidentally, components of the mixed material slurry can be suitably adjusted, based on the type of the electrode member of the production object. For example, in a case where the positive electrode is the production object, the positive electrode active material is added, in addition to the binder, the solid electrolyte particle, and the low polarity nonaqueous solvent. Likewise, in a case where the negative electrode is produced, the negative electrode active material is added, in addition to the binder, the solid electrolyte particle, and the low polarity nonaqueous solvent. Then, in a case where the solid electrolyte layer is produced, the binder, the solid electrolyte particle, and the low polarity nonaqueous solvent are mixed without adding the electrode active substance. Incidentally, each of materials (the binder, the solid electrolyte particle, the positive electrode active material, the negative electrode active material, or the like) has been already explained, and thus overlapped explanation is omitted.

Then, the herein disclosed production method uses the low polarity nonaqueous solvent as the solvent of the mixed material slurry. In a normal secondary battery, from a perspective of the affinity with the binder, a nonaqueous solvent having a high polarity, such as N-methylpyrrolidone (NMP), is used as the solvent of the mixed material slurry. However, there is a fear that the high polarity nonaqueous solvent reacts with the solid electrolyte particle so as to greatly reduce the ion conduction property. Thus, in the all-solid-state battery, it is required to use the low polarity nonaqueous solvent whose reactivity with the solid electrolyte particle is low. It should be noted that this low polarity nonaqueous solvent has a low affinity with the binder and tends to induce re-crystallization of the once-dissolve binder, so as to be a cause of making the mixed material slurry gelate. Although described later in details, the herein disclosed production method controls the temperature of the mixed material slurry, in order to prevent the gelation of the mixed material slurry even when the low polarity nonaqueous solvent described above is used. Incidentally, as one example of the low polarity nonaqueous solvent, it is possible to use butyl butyrate, heptane, methyl isocyanate, benzyl butyl phthalate, ε-caprolactam, methyl isobutyl ketone, diisobutyl ketone, p-xylene, anisole, or the like.

In addition, at the present step, a conventionally known stirring and mixing apparatus is used so as to perform a kneading treatment. As one example of the stirring and mixing apparatus described above, it is possible to use a ball mill, a roll mill, a mixer, a disper, a kneader, an ultrasonic homogenizer, or the like. In addition, it is preferable from a perspective of equally dispersing each component that kneading time is suitably adjusted. Although being different based on a component to be added or an apparatus to be used, as one example, regarding the kneading time, 2 minutes or more is preferable, 3 minutes or more is further preferable, 4 minutes or more is furthermore preferable, and 5 minutes or more is particularly preferable. On the other hand, from a perspective of keeping a suitable production efficiency, regarding the kneading time, 45 minutes or less is preferable, 35 minutes or less is further preferable, 25 minutes or less is furthermore preferable, and 20 minutes or less is particularly preferable.

(2) Molding Step S20

At the molding step S20, the mixed material slurry is molded to be in a desired shape. For example, in a case where the positive electrode 50 or the negative electrode 60 is the production object (electrode member), it is preferable at the present step that the surface of the collector foil is coated with the mixed material slurry. By doing this, the mixed material slurry can be molded in a layer shape, the mixed material slurry can be imparted on the collector foil. Thus, the electrode can be produced efficiently. Incidentally, it is preferable for coating with the mixed material slurry to use an applicator, a die coater, or the like. On the other hand, different from the positive electrode 50 and the negative electrode 60, the solid electrolyte layer 70 is not a member on which the collector foil sticks. In a case where the solid electrolyte layer 70 as described above is produced, it is preferable that the surface of the foil-shaped base material is coated with the mixed material slurry at the molding step S20, and that the base material is peeled off from the molded body after a later-described drying step S30 (mixed material slurry after drying). By doing this, the solid electrolyte layer 70 formed in a desired shape can be easily produced. Additionally, in a case where the solid electrolyte layer 70 is produced, it is not required to use the foil-shaped base material as described above. For example, the mixed material slurry can be molded in a layer shape by using an extrusion molding machine or the like, and thus the solid electrolyte layer 70 can be produced without using the base material.

(3) Drying Step S30

At the present step, the low polarity nonaqueous solvent is removed from the mixed material slurry after the molding step. Typically, at the present step, the mixed material slurry is heated at a temperature higher than a boiling point $T_b$ of the low polarity nonaqueous solvent. By doing this, the low polarity nonaqueous solvent is removed from the mixed material slurry, and the electrode member (molded body) containing the binder and the solid electrolyte particle is produced. Incidentally, a drying temperature at the present step is, from a perspective of shortening the drying time and of enhancing the production efficiency, preferably equal to or more than 90° C., further preferably equal to or more than 120° C., furthermore preferably equal to or more than 140° C., or preferably in particular equal to or more than 160° C. On the other hand, in a case where the drying temperature becomes too high, there is a possibility that the low polarity nonaqueous solvent is drastically boiled so as to induce a resistance rise caused by uneven distribution of the granular materials. From a perspective described above, the drying temperature is preferably equal to or less than 250° C., further preferably equal to or less than 220° C., furthermore preferably equal to or less than 200° C., or in particular preferably equal to or less than 170° C. In addition, it is preferable as the drying time to select a period for 0.1 minute to 10 minutes.

(4) Temperature Control for Mixed Material Slurry

Then, in the herein disclosed production method, at least until the molding step S20 is started, the temperature of the mixed material slurry is controlled in order to inhibit the re-crystallization of the binder once dissolved in the solvent. By doing this, it is possible to inhibit the gelation of the mixed material slurry so as to keep the viscosity in a low state. As this result, it is possible to easily mold the mixed material slurry and to inhibit reduction in the production efficiency of the electrode member. In addition, the uneven distribution of the granular material can be inhibited, and thus it is possible to suppress the rise of the battery resistance.

Incidentally, the particular temperature control of the mixed material slurry in the herein disclosed technique is not particularly restricted, if the re-crystallization of the binder can be inhibited until the start of the molding step S20. Below, the particular temperature control of the mixed material slurry will be explained while 2 embodiments are referred as examples.

(a) First Embodiment

In a first embodiment, at least until the start of the molding step S20, the temperature of the mixed material slurry is controlled to satisfy Formula (1) described below.

$$T_{max} \leq T_m \quad (1)$$

$T_m$ in Formula (1) represents "melt starting temperature of the binder". The melt starting temperature $T_m$ of the binder described above can be measured according to a following procedure. First, a test dispersion liquid is prepared in which the binder of a measuring object is dispersed into a solvent planned to be used for the mixed material slurry. Then, by using a differential scanning calorimeter device (made by TAInstruments Japan Corporation, DSC250) and by performing a differential scanning calorimeter analysis (DSC: differential scanning calorimetry) while gradually heating the test dispersion liquid, a DSC chart is obtained. Then, the temperature at which the heat absorption reaction was confirmed on the obtained DSC chart (heat absorption reaction starting temperature) is treated as "melt starting temperature $T_m$ of the binder". Incidentally, although not intended to restrict the herein disclosed technique, the melt starting temperature $T_m$ of the general binder used for the all-solid-state battery is about 40° C. to 60° C. (for example, 45° C. to 55° C.).

On the other hand, $T_{max}$ of Formula (1) represents "maximum temperature of the mixed material slurry". The wording "maximum temperature $T_{max}$ of the mixed material slurry" in the present description shows a maximum temperature of the mixed material slurry from the start of the slurry preparation step S10 to the start of the molding step S20.

Here, the temperature of the mixed material slurry tends to rise due to a shearing heat at the kneading process time, even if a particular heating process is not performed. Thus, if the slurry preparation step S10 is performed without the temperature control of the mixed material slurry, the maximum temperature $T_{max}$ of the mixed material slurry exceeds the melt starting temperature $T_m$ of the binder (becoming $T_{max} > T_m$), the crystal component of the binder is dissolved in the low polarity nonaqueous solvent. Then, the temperature of the mixed material slurry is reduced after the kneading process is ended, and thus the once-dissolved binder is re-crystallized. It is estimated in a conventional technique that this kind of mechanism induces the gelation of the mixed material slurry. In contrast, the production method in accordance with the present embodiment cools the mixed material slurry from the start of the slurry preparation step S10 to the start of the molding step S20, so as to keep the state of $T_{max} \leq T_m$ described above. By doing this, what the crystal component of the binder is dissolved in the low polarity nonaqueous solvent can be inhibited, thus no re-crystallization of the binder occurs, and therefore the gelation of the mixed material slurry can be inhibited.

Incidentally, a means for controlling the temperature of the mixed material slurry is not particularly restricted, and thus a conventionally known temperature adjust means can be used without particularly restriction. For example, it is possible to use a means of attaching a jacket to a container configured to accommodate the mixed material slurry, and of continuously supplying a cooling member (cold water, or the like) to this jacket during the slurry preparation step S10. By doing this, it is possible to suppress the temperature of the mixed material slurry from rising due to the shearing heat at the kneading time, so as to inhibit the maximum temperature $T_{max}$ of the mixed material slurry from exceeding the melt starting temperature $T_m$ of the binder. In addition, it is preferable that, in a case where the control for the temperature of the mixed material slurry is performed, measurement of the temperature of the mixed material slurry is continued and then the control for the temperature and supply amount of the cooling member is performed on the basis of the measurement result. By doing this, it is possible to stably inhibit the gelation of the mixed material slurry. In addition, the means for controlling the temperature of the mixed material slurry is not restricted to the above described means. For example, by using a means of reducing a rotation number at the kneading process so as to decrease the shearing heat, it is possible to control the temperature of the mixed material slurry.

In addition, it is preferable that the maximum temperature $T_{max}$ of the mixed material slurry in the present embodiment is a temperature lower than the melt starting temperature $T_m$ of the binder by 5° C. or more. By doing this, it is possible to surely inhibit the dissolution of the crystal component of the binder, and to suitably inhibit the gelation of the mixed material slurry. In addition, from a perspective of further surely inhibiting the dissolution of the binder, it is preferable that the maximum temperature $T_{max}$ of the mixed material slurry is a temperature lower than the melt starting temperature $T_m$ of the binder by 10° C. or more.

Incidentally, from a perspective of inhibiting the gelation of the mixed material slurry, a lower limit value of the maximum temperature $T_{max}$ of the mixed material slurry is not particularly restricted. For example, the maximum temperature $T_{max}$ of the mixed material slurry in the present embodiment is not particularly restricted, unless exceeding a freezing point TF of the low polarity nonaqueous solvent. As one example, the maximum temperature $T_{max}$ of the mixed material slurry might be equal to or more than −10° C., might be equal to or more than −5° C., or might be equal to or more than 0° C. It should be noted that, when the maximum temperature $T_{max}$ of the mixed material slurry exceeds a predetermined temperature, molecules of the binders become untied and thus dispersing the binders in the slurry becomes easy. By doing this, even in the present embodiment that the crystal component of the binder is not dissolved into the solvent, it is possible to sufficiently enhance the molding property of the mixed material slurry. From a perspective of a dispersibility of the binder, a lower limit value of the maximum temperature $T_{max}$ of the mixed material slurry is preferably equal to or more than 5° C., further preferably equal to or more than 10° C., or preferably in particular equal to or more than 15° C.

Incidentally, regarding the electrode member produced in the present embodiment, the heat absorption reaction starting temperature on the DSC chart obtained with the differential scanning calorimeter analysis tends to be a lower temperature than the conventional electrode member. In particular, regarding the binder having been once dissolved and having re-crystallized, the heat absorption reaction starting temperature becomes higher than one before the re-crystallization. In other words, by obtaining the DSC chart of the electrode member and examining its heat absorption reaction starting temperature, it is possible to examine whether the gelation of the re-crystallization of the binder at the production step is suppressed or not.

(b) Second Embodiment

In the present embodiment, at least until the start of the molding step S20, the temperature of the mixed material slurry is controlled to satisfy following Formula (2) and Formula (3).

$$T_m < T_{max} < T_b \qquad (2)$$

$$T_{min} \geq T_c \qquad (3)$$

Incidentally, similarly to the above described first embodiment, $T_m$ on Formula (2) of the present embodiment is "melt starting temperature of the binder", and $T_{max}$ is "maximum temperature of the mixed material slurry". In addition, $T_b$ is "boiling point of the low polarity nonaqueous solvent". In other words, Formula (2) in the second embodiment means to rise the maximum temperature $T_{max}$ of the mixed material slurry within a range where the low polarity nonaqueous solvent does not evaporate, and to dissolve the binder in the low polarity nonaqueous solvent. Then, in the present embodiment, as shown in Formula (3) described above, the temperature of the mixed material slurry is controlled to make the minimum temperature $T_{min}$ of the mixed material slurry be equal to or more than the re-crystallization temperature $T_c$ of the binder ($T_{min} \geq T_c$). In other words, regarding the present embodiment, the binder is dissolved in the solvent at the slurry preparation step, but the temperature of the mixed material slurry is kept to be in a high state in order to inhibit the matter that the binder re-crystallizes at the later step. Even in a case where this kind of temperature control is performed, the gelation of the mixed material slurry due to the re-crystallization of the binder can be inhibited.

Incidentally, "re-crystallization temperature $T_c$ of the binder" in the present description can be measured according to the following procedure. At first, by adding the binder being the measuring object into the solvent planned to be used for the mixed material slurry and then by heating the resultant to a temperature exceeding the melt starting temperature $T_m$ of the binder so as to dissolve the binder, the test solution is prepared. Then, the differential scanning calorimeter analysis is performed while the test solution is gradually cooled, so as to obtain the DSC chart. Then, the temperature (exothermic reaction starting temperature) on the obtained DSC chart at which the exothermic reaction has been confirmed is regarded as "re-crystallization temperature $T_c$ of the binder". Incidentally, although not restricting the herein disclosed technique, the re-crystallization temperature $T_c$ of the general binder used in the all-solid-state battery is about 25° C. to 45° C. (for example, 30° C. to 45° C.). In addition, the wording "minimum temperature $T_{min}$ of the mixed material slurry" in the present description shows the minimum temperature of the mixed material slurry from the end of the slurry preparation step S10 to at least the start of the molding step S20. From a perspective of surely inhibiting the uneven distribution of the granular particles, it is preferable to show the minimum temperature of the mixed material slurry from the end of the slurry preparation step S10 to the start of the drying step S30.

Incidentally, a means for controlling the temperature of the mixed material slurry in the present embodiment is not particularly restricted, neither, and a conventionally known means can be used without particularly restriction. For example, similarly to the first embodiment, it might be to attach the jacket to the container configured to accommodate the mixed material slurry, so as to supply a heating member (warm water, or the like) to this jacket until the start of the molding step S20. By doing this, it is possible to control the temperature of the mixed material slurry while satisfying Formulas (2) and (3) described above, and to inhibit the gelation of the mixed material slurry. In addition, similarly to the first embodiment, it is preferable to continuously measure the temperature of the mixed material slurry, so as to control the temperature of the heating member, the supply amount, and the like, based on the measurement result. By doing this, it is possible to stably inhibit the gelation of the mixed material slurry.

Incidentally, it is preferable that the minimum temperature $T_{min}$ of the mixed material slurry in the present embodiment is a temperature higher than the re-crystallization temperature $T_c$ of the binder by 5° C. or more. By doing this, it is possible to surely inhibit the dissolved binder from re-crystallizing, so as to further suitably inhibit the gelation of the mixed material slurry. In addition, from a perspective of further surely inhibiting the re-crystallization of the binder, it is preferable that the minimum temperature $T_{min}$ of the mixed material slurry is a temperature higher than the re-crystallization temperature $T_c$ of the binder by 10° C. or more.

(c) Summary of Temperature Control

As described above, even in a case where any means of the above described first and second embodiments, it is possible to inhibit the crystal component of the once-dissolve binder from re-crystallizing. By doing this, the gelation of the mixed material slurry can be inhibited and the viscosity can be kept in a low state, and thus it is possible to inhibit the reduction in the production efficiency of the electrode member. In addition, the uneven distribution of the granular materials due to the gelation also can be inhibited, and thus it is possible to stably produce the all-solid-state battery whose battery resistance is low.

Incidentally, even in any of the above described first embodiment and the second embodiment, it is required to perform the temperature control for inhibiting the re-crystallization of the binder at least until the molding step S20 is started. In particular, regarding the production of the electrode member of the all-solid-state battery, after the slurry preparation step S10 is completed, the mixed material slurry might be held for several hours (for example, 8 hours or more) and then the molding step S20 might be performed. In order to inhibit the gelation of the mixed material slurry from occurring during this kind of holding operation, it is required to continuously perform the temperature control at least until the start of the molding step S20. In addition, although the temperature control is comparatively difficult, from a perspective of surely inhibiting the uneven distribution of the granular materials, it is preferable to continue the temperature control of the mixed material slurry until the drying step S30 is performed. This kind of temperature control after the molding step S20 can be performed, for example, by adjusting a production environment (room temperature). Incidentally, the gelation of the slurry does not occur if the solvent is removed, and thus it is not required after the drying step S30 to perform the temperature control according to the herein disclosed technique.

Test Example

Below, a test example related to the herein disclosed technique will be explained. Incidentally, the following test example is not intended to restrict the herein disclosed technique into the test example.

<<First Test>>

In the present test, 18 kinds of positive electrodes, whose melt starting temperature $T_m$ of the binder and maximum temperatures $T_{max}$ of the mixed material slurry were individually different, were produced. Then, each positive electrode was used to construct the all-solid-state battery (Samples 1 to 18).

1. Sample Preparation

The mixed material slurry for the positive electrode was prepared in which the positive electrode active material ($LiNi_{0.33}Mn_{0.33}Co_{0.33}O_2$), the solid electrolyte particle (sulfide-based solid electrolyte), the electrical conducting material (VGCF), the binder (PVdF-HFP), and the low polarity nonaqueous solvent (butyl butyrate: boiling point $T_b=170°$ C.) were mixed. A mix ratio (weight ratio) of respective materials was set to be positive electrode active material:solid electrolyte particle:electrical conducting material:binder=0.60:0.30:0.05:0.05. In addition, regarding the preparation of the mixed material slurry, an ultrasonic homogenizer was used so as to perform a kneading process for 0.2 to 3 minutes. Then, after the prepared mixed material slurry was held for 6 hours, an applicator was used so as to coat a surface of the positive electrode collector foil (made of aluminum) with the mixed material slurry. Then, by drying the coated mixed material slurry, the positive electrode was produced.

The mixed material slurry for the negative electrode was prepared in which the negative electrode active material (natural graphite), the solid electrolyte particle (sulfide-based solid electrolyte), the electrical conducting material (VGCF), the binder (PVdF-HFP), and the low polarity nonaqueous solvent (butyl butyrate) were mixed. A mix ratio (weight ratio) of respective materials was set to be negative electrode active material:solid electrolyte particle:electrical conducting material:binder=0.63:0.6:0.05:0.06. In addition, for kneading the mixed material slurry, an ultrasonic homogenizer was used so that the kneading process was performed for 0.2 to 3 minutes. Then, an applicator was used to coat the surface of the negative electrode collector foil (made of nickel) with the mixed material slurry, and then a drying process was performed to produce the negative electrode.

The mixed material slurry for the solid electrolyte layer was prepared in which the solid electrolyte particle (sulfide-based solid electrolyte), the binder (PVdF-HFP), and the low polarity nonaqueous solvent (butyl butyrate) were mixed. A mix ratio (weight ratio) of respective materials was set to be solid electrolyte particle:binder=0.96:0.04. In addition, for kneading the mixed material slurry, an ultrasonic homogenizer was used so that the kneading process was performed for 0.2 to 3 minutes. Then, the applicator was used to coat the surface of the base material (aluminum foil) with the mixed material slurry, the drying process was performed, and then the base material was peeled off, so as to produce the solid electrolyte layer.

Then, by laminating the positive electrode, the solid electrolyte layer, and the negative electrode, the electrode body was formed. In addition, the positive electrode terminal (aluminum plate) was connected to the positive electrode collector foil, and the negative electrode terminal (copper plate) was connected to the negative electrode collector foil. Then, by opposing a pair of laminate films while the electrode body was sandwiched, and then by welding an outer circumferential edge part of the laminate film, the all-solid-state battery was constructed.

Then, in the present test, for producing the positive electrode, the melt starting temperatures $T_m$ of the binder and the maximum temperatures $T_{max}$ of the mixed material slurry of Samples 1 to 18 were individually differentiated. The melt starting temperature $T_m$ of the binder and the maximum temperature $T_{max}$ of the mixed material slurry of each sample are shown in Table 1. Incidentally, in the present test, a thermometer was attached to the container configured to accommodate the mixed material slurry, the temperature of the mixed material slurry was continuously measured, and then the maximum temperature measured, until the coating operation was performed on the positive electrode collector foil, was regarded as "maximum temperature $T_{max}$ of the mixed material slurry". In addition, the DSC chart was obtained with the above described procedure, and then the heat absorption reaction starting temperature was regarded as "melt starting temperature $T_m$ of the binder".

Figure 4:
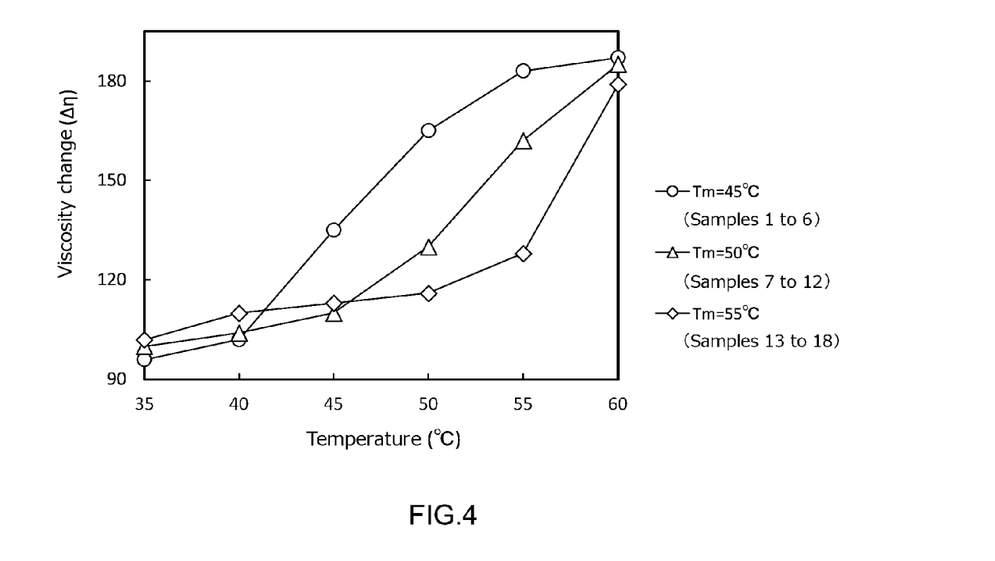
FIG. 4 is a graph that shows a measurement result of viscosity increasing rates of Samples 1 to 18.

2. Evaluation Test (1) Measurement of Viscosity Increasing Rate of Slurry

Here, under an environment of a room temperature (25° C.), an E-type viscometer was used to set a shearing speed becoming 40/s, and then a viscosity ($\eta_0$) of the mixed material slurry just after preparation was measured. Next, under the same condition, a viscosity ($\eta_{6h}$) of the mixed material slurry after 6 hours since the preparation was measured. Then, based on these measurement results, the viscosity increasing rate of the mixed material slurry ($\Delta\eta=\eta_{6h}/\eta_0\times100$) was calculated. The calculation results are shown in Table 1 and FIG. 4.

Figure 5:
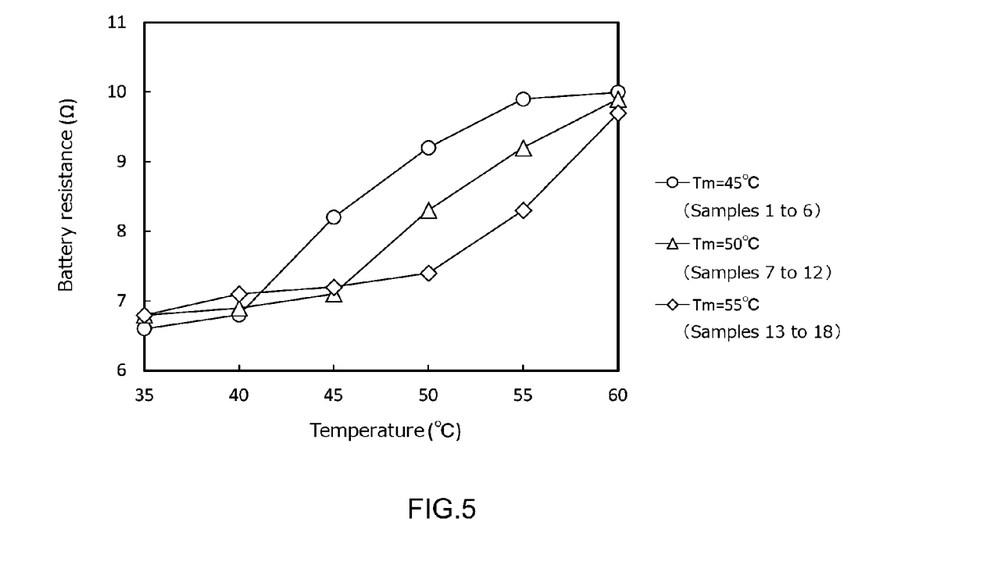
FIG. 5 is a graph that shows a measurement result of battery resistances of Samples 1 to 18.

(2) Measurement of Battery Resistance

After initial charge and discharge were performed for the all-solid-state battery of each sample, a constant current electric discharge was performed under an environment of the room temperature (25° C.), at 3 C from SOC 50%, for 10 seconds. Then, the voltage ($V_0$) before the electric discharge and the voltage after the electric discharge ($V_{10sec}$) were measured, and thus the battery resistance was calculated, on a basis of the change amount ($\Delta V=V_0-V_{10sec}$) of these voltages. The calculation results are shown in Table 1 and FIG. 5.

TABLE 1

| | Electrode | Melt starting temperature $T_m$ of binder (° C.) | Maximum temperature $T_{max}$ of mixed material slurry (° C.) | Viscosity changing rate ($\Delta\eta$) (%) | Battery resistance ($\Omega$) |
|---|---|---|---|---|---|
| Sample 1 | Positive electrode | 45 | 35 | 96 | 6.6 |
| Sample 2 | | | 40 | 102 | 6.8 |
| Sample 3 | | | 45 | 135 | 8.2 |
| Sample 4 | | | 50 | 165 | 9.2 |
| Sample 5 | | | 55 | 183 | 9.9 |
| Sample 6 | | | 60 | 187 | 10.0 |
| Sample 7 | | 50 | 35 | 100 | 6.8 |
| Sample 8 | | | 40 | 104 | 6.9 |
| Sample 9 | | | 45 | 110 | 7.1 |
| Sample 10 | | | 50 | 130 | 8.3 |
| Sample 11 | | | 55 | 162 | 9.2 |
| Sample 12 | | | 60 | 185 | 9.9 |
| Sample 13 | | 55 | 35 | 102 | 6.8 |
| Sample 14 | | | 40 | 110 | 7.1 |
| Sample 15 | | | 45 | 113 | 7.2 |
| Sample 16 | | | 50 | 116 | 7.4 |
| Sample 17 | | | 55 | 128 | 8.3 |
| Sample 18 | | | 60 | 179 | 9.7 |

As shown in Table 1 and FIG. 4, on Samples 1 to 3, 7 to 10, and 13 to 17, the gelation of the mixed material slurry did not occur and the viscosity increasing rate after 6 hours was suppressed to be equal to or less than 140%. In addition, as shown in Table 1 and FIG. 5, regarding these samples on which the gelation was inhibited, the battery resistance was suppressed to be equal to or less than 9Ω. From the results described above, it was found regarding the production of the positive electrode that, if the temperature of the mixed material slurry was controlled to make the maximum temperature $T_{max}$ of the mixed material slurry be equal to or less than the melt starting temperature $T_m$ of the binder ($T_m \leq T_m$), the gelation of the mixed material slurry can be inhibited so as to construct the all-solid-state battery having a low resistance.

<<Second Test>>

In the present test, the object to be subjected to the temperature control was changed to the negative electrode. In other words, 18 kinds of negative electrodes, whose melt starting temperatures $T_m$ of the binder and maximum temperatures $T_{max}$ of the mixed material slurry were individually differentiated, were produced, and each negative electrode was used, so as to construct the all-solid-state battery (Samples 19 to 36).

1. Sample Preparation

In the present test, with a procedure the same as one of Sample 1 of the first test, the positive electrode and the solid electrolyte layer were produced. Then, in the present test, for producing the negative electrode, the melt starting temperatures $T_m$ of the binder and the maximum temperatures $T_{max}$ of the mixed material slurry of Samples 19 to 36 were individually differentiated. The melt starting temperature binder $T_m$ of the binder and the maximum temperature $T_{max}$ of the mixed material slurry of each sample are shown in Table 2.

2. Evaluation Test

According to a procedure the same as one of the first test, the viscosity increasing rate of the slurry and the battery resistance were measured. The measurement results of the viscosity increasing rate of the slurry are shown in Table 2 and FIG. 6. In addition, the measurement results of the battery resistance are shown in Table 2 and FIG. 7.

TABLE 2

| | Electrode | Melt starting temperature $T_m$ of binder (° C.) | Maximum temperature $T_{max}$ of mixed material slurry (° C.) | Viscosity changing rate ($\Delta\eta$) (%) | Battery resistance ($\Omega$) |
|---|---|---|---|---|---|
| Sample 19 | Negative | 45 | 35 | 97 | 6.5 |
| Sample 20 | elec- | | 40 | 103 | 6.7 |
| Sample 21 | trode | | 45 | 138 | 8.1 |
| Sample 22 | | | 50 | 169 | 9.4 |
| Sample 23 | | | 55 | 188 | 9.7 |
| Sample 24 | | | 60 | 192 | 9.9 |
| Sample 25 | | 50 | 35 | 101 | 6.7 |
| Sample 26 | | | 40 | 105 | 6.8 |
| Sample 27 | | | 45 | 112 | 7.0 |
| Sample 28 | | | 50 | 133 | 8.2 |
| Sample 29 | | | 55 | 166 | 9.3 |
| Sample 30 | | | 60 | 190 | 9.8 |
| Sample 31 | | 55 | 35 | 103 | 6.7 |
| Sample 32 | | | 40 | 112 | 7.0 |
| Sample 33 | | | 45 | 115 | 7.1 |
| Sample 34 | | | 50 | 118 | 7.2 |
| Sample 35 | | | 55 | 130 | 8.2 |
| Sample 36 | | | 60 | 184 | 9.6 |

Figure 6:
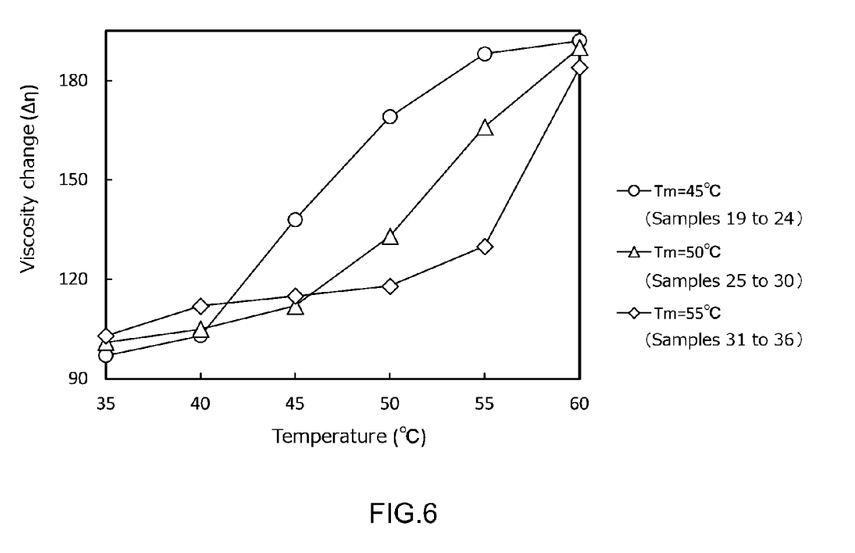
FIG. 6 is a graph that shows a measurement result of viscosity increasing rates of Samples 19 to 36.
Figure 7:
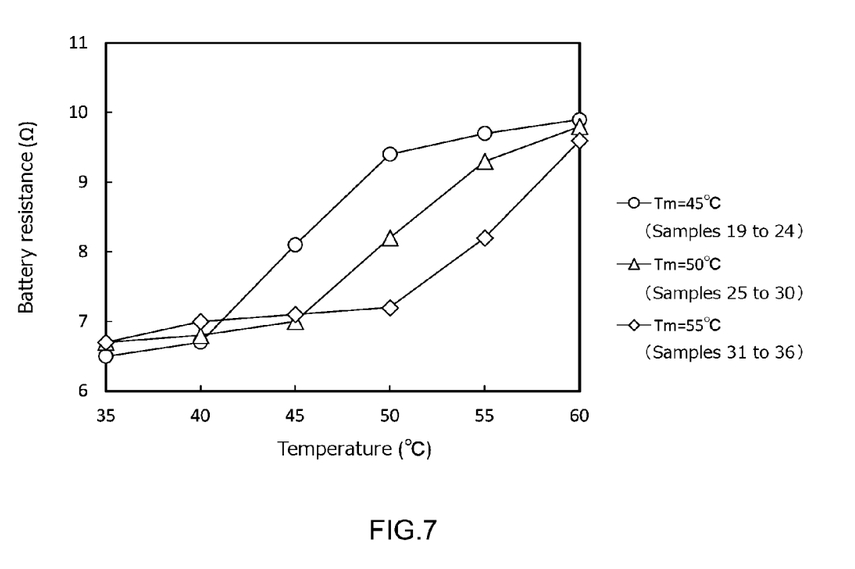
FIG. 7 is a graph that shows a measurement result of battery resistances of Samples 19 to 36.

As shown in Table 2 and FIG. 6, on Samples 19 to 21, 25 to 28, and 31 to 35, the gelation of the mixed material slurry did not occur and the viscosity increasing rate after 6 hours was suppressed to be equal to or less than 140%. Then, as shown in Table 2 and FIG. 7, regarding these samples, the battery resistance was suppressed to be equal to or less than 9$\Omega$. From the results described above, it was found also regarding the production of the negative electrode that, by controlling the temperature of the mixed material slurry to satisfy $T_{max} \leq T_m$, the gelation of the mixed material slurry could be inhibited.

<<Third Test>>

In the present test, regarding the mixed material slurry after the binder was dissolved in the solvent, the temperature control for inhibiting the gelation of the mixed material slurry was examined. In particular, 9 kinds of positive electrodes, whose re-crystallization temperatures $T_c$ of the binder and minimum temperatures $T_{min}$ of the mixed material slurry were individually differentiated, were produced, and each positive electrode was used, so as to construct the all-solid-state battery (Samples 37 to 48).

1. Sample Preparation

In the present test, with a procedure the same as one of Sample 1 of the first test described above, the solid electrolyte layer and the negative electrode were produced. Then, for producing the positive electrode, the temperature of the mixed material slurry during the kneading operation was controlled to make the maximum temperature $T_{max}$ of the mixed material slurry exceed the melt starting temperature $T_m$ of the binder, and thus the mixed material slurry was prepared in which the binder was dissolved into the solvent. Then, the prepared mixed material slurry was held for 6 hours while being kept at a predetermined temperature, and the applicator was used so as to coat the surface of the positive electrode collector foil with the mixed material slurry. At that time, in the present test, the temperature of the mixed material slurry during holding operation of each sample was individually differentiated, and the minimum temperature $T_{min}$ was measured. Additionally, in the present test, the binders whose exothermic temperature (crystallization temperature $T_c$) were individually differentiated on the DSC chart were used for respective samples. The minimum temperature $T_{min}$ of the mixed material slurry and the crystallization temperature $T_c$ are shown in Table 3.

2. Evaluation Test

Accordingly to a procedure the same as one of the first test, the viscosity increasing rate of the slurry and the battery resistance were measured. The measurement results of the viscosity increasing rate of the slurry are shown in Table 3 and FIG. 8. In addition, the measurement results of the battery resistance are shown in Table 3 and FIG. 9.

TABLE 3

| | Electrode | Re-crystallization temperatures $T_c$ of binder (° C.) | Minimum temperature $T_{min}$ of mixed material slurry (° C.) | Viscosity changing rate ($\Delta\eta$) (%) | Battery resistance ($\Omega$) |
|---|---|---|---|---|---|
| Sample 37 | Positive | 30 | 25 | 183 | 9.9 |
| Sample 38 | elec- | | 30 | 140 | 8.5 |
| Sample 39 | trode | | 35 | 118 | 7.5 |
| Sample 40 | | | 40 | 115 | 7.2 |
| Sample 41 | | | 45 | 100 | 7.0 |
| Sample 42 | | | 50 | 99 | 6.9 |
| Sample 43 | | 40 | 25 | 183 | 9.7 |
| Sample 44 | | | 30 | 172 | 9.7 |
| Sample 45 | | | 35 | 165 | 9.2 |
| Sample 46 | | | 40 | 134 | 8.2 |
| Sample 47 | | | 45 | 113 | 7.6 |
| Sample 48 | | | 50 | 103 | 6.9 |

Figure 8:
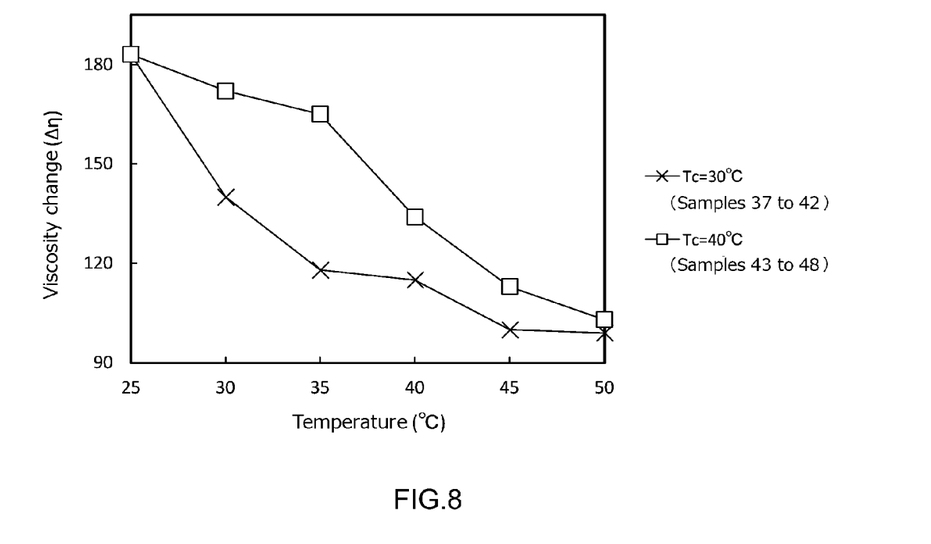
FIG. 8 is a graph that shows a measurement result of viscosity increasing rates of Samples 37 to 48.
Figure 9:
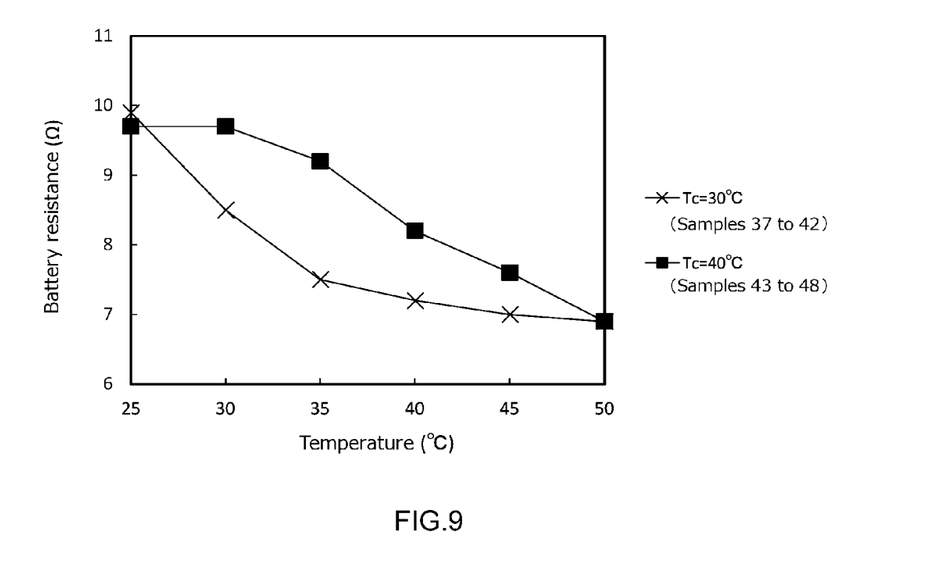
FIG. 9 is a graph that shows a measurement result of battery resistances of Samples 37 to 48.

As shown in Table 3 and FIG. 8, on Samples 38 to 42 and 46 to 48, the gelation of the mixed material slurry did not occur and the increasing rate of the viscosity after 6 hours was suppressed to be equal to or less than 140%. Then, as shown in Table 3 and FIG. 9, regarding these samples, the battery resistance was suppressed to be equal to or less than 9$\Omega$. From these experiment results, it was found, in a case where the maximum temperature $T_{max}$ of the mixed material slurry exceeded the melt starting temperature $T_m$ of the binder and thus the binder was dissolved into the solvent, the gelation of the mixed material slurry could be inhibited if the temperature of the mixed material slurry was controlled to inhibit the minimum temperature $T_{min}$ of the mixed material slurry from being lower than the crystallization temperature $T_c$ of the binder.

Above, the present disclosure has been explained in details, but the above described embodiments and practical examples are merely illustrations, and the herein disclosed technique includes contents in which the above described specific examples are variously deformed or changed.

REFERENCE SIGNS LIST

1 All-solid-state battery
10 Electrode body
20 Outer package
30 Positive electrode terminal
40 Negative electrode terminal
50 Positive electrode
52 Positive electrode collector foil
54 Positive electrode mixed material layer
60 Negative electrode
62 Negative electrode collector foil
64 Negative electrode mixed material layer
70 Solid electrolyte layer

The invention claimed is:

1. A method for producing an electrode member that configures an electrode body of an all-solid-state battery, comprising:
   a slurry preparation step that prepares a mixed material slurry which comprises at least a binder, a solid electrolyte particle, and a low polarity nonaqueous solvent;
   a molding step that molds the mixed material slurry in a desired shape; and
   a drying step that removes the low polarity nonaqueous solvent from the molded mixed material slurry so as to obtain a molded body, wherein
   in a case where a melt starting temperature of the binder is represented as $T_m$ and a maximum temperature of the mixed material slurry is represented as $T_{max}$, the temperature of the mixed material slurry is controlled, at least until the molding step is started, to satisfy following Formula (1)

$$T_{max} \leq T_m \qquad (1).$$

2. The method according to claim 1, wherein
the binder is polyvinylidene fluoride (PVdF).

3. The method according to claim 1, wherein
the binder is PVdF-HFP that is a copolymer with vinylidene fluoride (VDF) and hexafluoropropylene (HFP).

4. The method according to claim 1, wherein
the maximum temperature $T_{max}$ of the mixed material slurry is a temperature lower than the melt starting temperature $T_m$ of the binder by 5° C. or more.

5. The method according to claim 1, wherein
the electrode member is a positive electrode or a negative electrode in which a mixed material layer comprising the solid electrolyte particle and an electrode active substance is formed on a surface of a collector foil, and
at the molding step, the surface of the collector foil is coated with the mixed material slurry.

6. The method according to claim 1, wherein
the electrode member is a solid electrolyte layer comprising the solid electrolyte particle, and
at the molding step, a surface of a foil-shaped base material is coated with the mixed material slurry and the foil-shaped base material is peeled off from the molded body obtained after the drying step.

* * * * *